May 6, 1958
J. J. OWEN ET AL
2,833,725
REGENERATION OF HYDROGENATION CATALYST
Filed Feb. 5, 1953
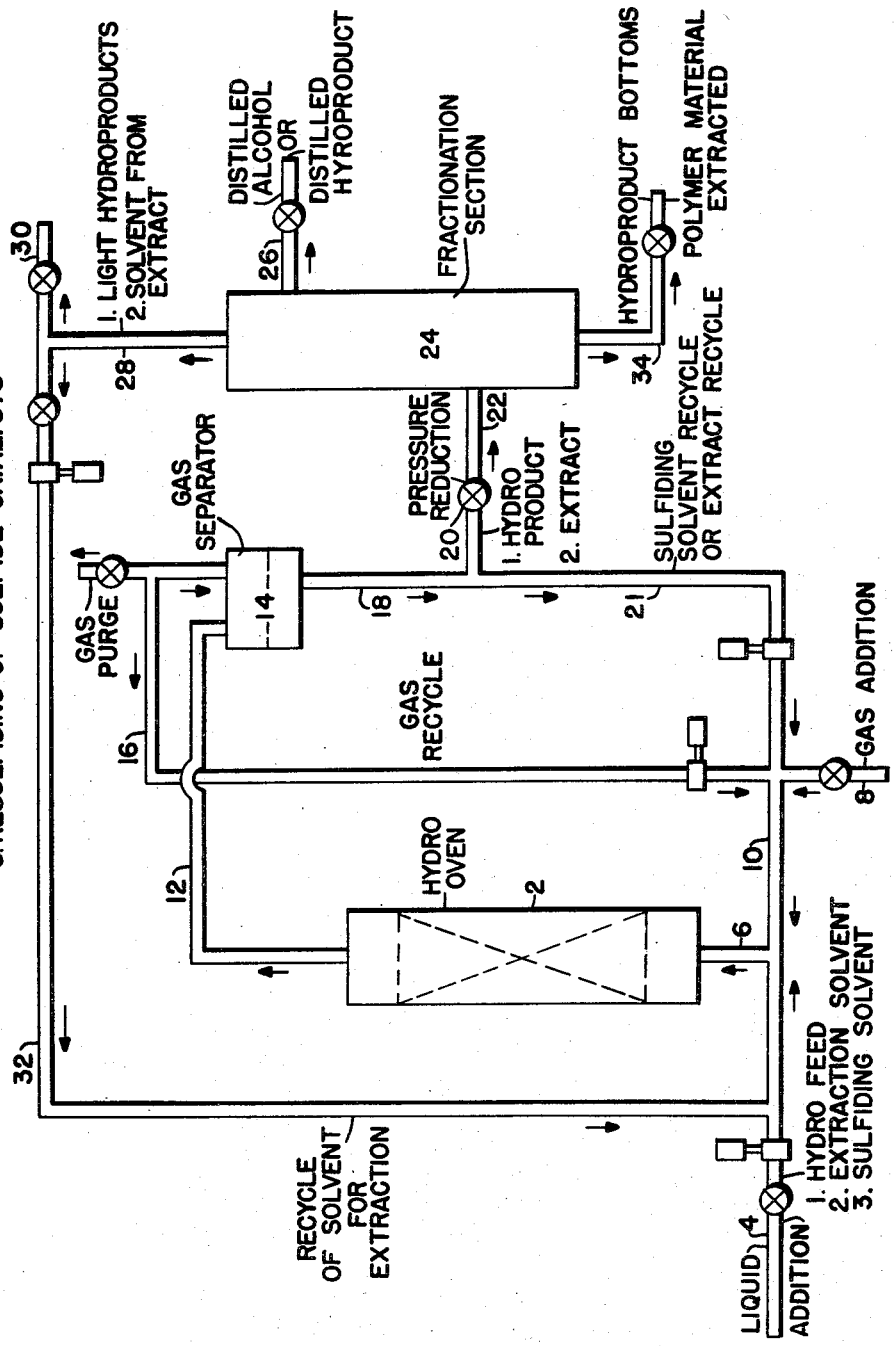
John J. Owen
Ralph B. Mason
Rhea N. Watts
Inventors
By Henry Berp  Attorney

United States Patent Office 2,833,725
Patented May 6, 1958

2,833,725
REGENERATION OF HYDROGENATION CATALYST

John J. Owen, Ralph B. Mason, and Rhea N. Watts, Baton Rouge, La., assignors to Esso Research and Engineering Company, a corporation of Delaware Application February 5, 1953, Serial No. 335,366

4 Claims. (Cl. 252—414)

The present invention relates to the production of oxygenated organic compounds by the reaction of olefinic carbon compounds with hydrogen and carbon monoxide in the presence of a cobalt carbonylation catalyst. More specifically, the present invention relates to an improved process for increasing the useful life of the hydrogenation catalyst employed in the reaction.

It is now well known that alcohols may be synthesized from olefins by reaction of the latter with CO and $H_2$ in the presence of a catalyst containing cobalt, in an essentially three stage system. In the first stage the olefinic material, synthesis gas and catalyst are reacted under pressure to give a product consisting predominantly of aldehydes containing one more carbon atom than the olefinic starting material, as well as certain amounts of secondary reaction products, polymeric material, high boiling oxygenated materials, and the like. This oxygenated organic mixture, which contains in solution, compounds of cobalt, particularly cobalt carbonyls, is then passed to a catalyst decomposition, or decobalting zone, where the cobalt carbonyl is decomposed in the presence of heat and a gaseous or liquid fluid. The aldehyde product is thereafter generally hydrogenated to the corresponding alcohol.

Most all olefinic hydrocarbons and substituted hydrocarbons, such as alcohols, ketones, esters, acids, are susceptible to this type of reaction. The catalyst for the first stage of the reaction, wherein the aldehyde synthesis occurs, is usually added in the form of oil soluble salts of cobalt, such as cobalt oleate, naphthenate and the like. $H_2$ and CO are usually added in about equimolecular proportions, and reaction conditions usually include, in the first stage, pressures of about 2000–4500 p. s. i. g., and temperatures in the range of about 200–450° F.

The hydrogenation stage may be operated at conventional hydrogenation conditions which include temperatures of about 350 to 550° F. and pressures of about the same order of magnitude as those obtaining in the aldehyde synthesis reaction zone. Hydrogenation catalysts may include nickel, tungsten, molybdenum, their oxides and sulfides, and other hydrogenation catalysts, including copper, chromium and their compounds. An excellent catalyst in this service has been found to be molybdenum sulfide, supported on activated carbon. This catalyst is sulfur-insensitive, and most olefin feed streams contain varying amounts of sulfur which would poison such sulfur-sensitive catalysts as nickel, copper and platinum.

Furthermore, this catalyst which is prepared by impregnating pellets of activated carbon with ammonium molybdate, heating, and sulfiding the molybdenum oxide thus formed has been found to have an exceptionally high mechanical strength. Since the hydrogenation is a liquid phase operation in which the catalyst is subjected to the action of high velocity liquid streams, mechanical ruggedness is an important criterion of a suitable catalyst. Furthermore, water is generally present in the stream to the hydrogenation stage, for this has been found to aid alcohol selectivity in the hydrogenation reaction, and only strong catalysts can withstand the effect of water.

It has been found, however, that in the course of the hydrogenation reaction the catalyst gradually loses its activity and becomes deactivated. In the early stages of this activity loss, this may be compensated in part by raising the temperature of hydrogenation. However, an appreciable increase in hydrogenation temperature is accompanied by decrease in alcohol selectivity and increase in formation of hydrocarbons, thus materially cutting down yields. It has also been found that when it is attempted to reactivate the hydrogenation catalyst by sulfiding it, i. e. by treating the deactivated catalyst with $H_2S$ or $CS_2$, only a temporary and partial reactivation was obtained.

One of the major problems involved in the aldehyde synthesis reaction is the fact that cobalt, though originally added as organic salt to the reaction zone, reacts with the CO and $H_2$ under the synthesis conditions to form the carbonyls. There is basis for the belief that the metal carbonyl or hydrocarbonyl is the active form of the catalyst. The carbonyl remaining dissolved in the reaction product from the primary carbonylation stage must thus be removed in an intermediate catalyst removal stage and this is customarily done by heating the primary reaction product in a suitable chamber or tower with or without packing at atmospheric or superatmospheric pressures and usually in the presence of a slow stream of an inert stripping gas such as hydrogen in order to remove overhead the carbon monoxide resulting from the decomposition of the metal carbonyl to protect the nickel or cobalt or other carbonyl-forming metal employed in the subsequent high pressure hydrogenation stage. This process is quite satisfactory as far as removing the cobalt carbonyl is concerned, by decomposing the latter into metallic cobalt and carbon monoxide, though small quantities of other metallic carbonyls, in particular iron carbonyl, are not completely removed by this process. Iron carbonyl may arise from various sources, such as from the interaction of carbon monoxide at high pressures with iron-containing impurities in the feed, reaction of carbon monoxide with the walls of the reactor and transfer lines, reactor packing, and the like. Iron carbonyl is considerably more stable than the cobalt analogue and thus while the latter is decomposed under decobalting conditions in the catalyst removal zone, iron carbonyl may only be partially decomposed. Furthermore, it has been found that other cobalt compounds, in particular cobalt formate, not specifically added as catalyst, may be present in as much as 0.5% of the effluent from the decobalting zone. These compounds are not readily decomposed by heat in the presence of an inert gas such as hydrogen. It is highly undesirable for soluble metal to be present in the product leaving the catalyst removal zone because of the tendency for the metal to decompose under the more severe conditions, obtaining in the hydrogenation zone and in the preceding heating coils.

In the past, more efficient decobalting, particularly in the presence of organic acids, and also, with hot water and steam, has considerably reduced the amount of dissolved cobalt left in the decobalter effluent which is employed as feed to the hydrogenation stage. However, even when only a few parts per million of cobalt are left in the hydrogenation feed, it has been found that this material is deposited on the hydrogenation catalyst, and this deposition is in part responsible for the decrease in activity of the hydrogenation catalyst.

It was attempted to remove this deposited cobalt and other carbonyl-forming metal by passing a carbon monoxide-containing gas through the catalyst under carbonyl forming conditions but this method proved unsatisfactory, and again the reactivation was incomplete and cobalt removal from the catalyst only partial, particularly in the case of the molybdenum sulfide on charcoal catalyst.

It has now been found that hydrogenation catalysts employed in the hydrogenation of aldehydes formed by the carbonylation reaction may effectively be reactivated by treatment with a polar solvent. This is particularly true with the molybdenum sulfide on charcoal catalyst, for the higher temperatures employed with said catalyst results in the production of high boiling oxygenated materials and polymeric products. Furthermore, these high molecular weight materials have been found to accumulate on the pores and interstices of the catalyst, gradually decreasing its surface area as well as its activity. It has further been found that these high-boiling materials may be extracted by polar solvents, in particular by such solvents as methyl ethyl ketone and acetone.

In a preferred embodiment of the invention, the cobalt deposited on the catalyst surface is also removed by treatment of the spent catalyst with a CO containing gas in the presence of a polar solvent, such as methyl ethyl ketone. Treatment with CO is not enough, for it has been found that the high boiling material forms a polymeric coating upon the deposited cobalt. By concomitant removal of the latter by the solvent, the cobalt may thus be removed readily by the carbon monoxide. The catalyst thus treated and regenerated has a high surface area and activity of the same order of magnitude as the fresh catalyst, and this catalyst may also be resulfided more effectively than the spent catalyst not treated in accordance with the process of the present invention.

The catalyst deactivated by loss of surface area due to the deposition of metallic cobalt and high boiling organic materials and polymers may be treated with a solvent selected from the class of chlorinated hydrocarbons, chlorinated ethers, ketones, ethers, and alcohols. Thus, suitable for this purpose are carbon tetrachloride, chloroform, ethyl ether, acetone, methyl ethyl ketone, ethanol, octanols and the like. The extractions, though they may be carried out at atmospheric pressures, and at temperatures close to the normal boiling point of the solvent, are preferably carried out in the presence of a carbon monoxide-containing gas at pressures in the range of 1500 to 4500 p. s. i. g., and at temperatures in the range of 100–500° F.

Having set forth its general nature, the invention will best be understood from the following more detailed description, in which reference will be made to the accompanying drawing. The carbonylation and the decobalting stages being now well-known they are not shown in the drawing.

Referring now to the drawing, liquid product consisting essentially of aldehydes and containing not more than about 5 parts per million of cobalt is passed to the lower portion of hydrogenator 2 via lines 4 and 6. Hydrogen is supplied to reactor 2 via lines 8, 10 and 6 in proportions sufficient to convert the aldehyde product into the corresponding alcohol. The catalyst within reactor 2 is preferably a sulfactive one; an excellent catalyst is one comprising molybdenum sulfide supported on activated carbon. Hydrogenator 2 may be operated at pressures from about 2500–4500 p. s. i. g., temperatures of from about 400–550° F., and liquid feed rates of about 0.25–2 v./v./hr. It is also beneficial to add to the hydrogenation zone from 1–10% water to aid in selectivity to alcohol.

Products of the hydrogenation reaction are withdrawn overhead through line 12 and passed to liquid-gas separator 14. Recycle gas may be withdrawn overhead through line 16 and at least in part recycled to hydrogenator 4. Liquid crude alcohol product is withdrawn through line 18 and is passed to fractionation section 24 through pressure reducing valve 20 and line 22. In tower 24, products boiling below the boiling point of the desired alcohol product, and consisting mainly of unreacted hydrocarbons and over-hydrogenated alcohols are withdrawn overhead through lines 28 and 30, while the alcohol product itself is withdrawn through line 26 and passed to storage. Bottoms product, consisting mainly of high boiling oxygenated compounds, aldols, esters and the like, are withdrawn downwardly through line 34 for further processing.

In the course of the continuous reaction described above, it is generally observed that after a period of days, it becomes necessary to raise the temperature in the hydrogenation oven in order to maintain a given or desired extent and degree of hydrogenation. Thus, it is generally desirable to maintain hydrogenation such that there is a carbonyl number of less than 1 in the alcohol product. As the catalyst becomes increasingly spent and contaminated both with resinous material and deposited cobalt, ever increasing temperatures are required to obtain this low carbonyl value. However, as the temperature is raised as has been pointed out, alcohol selectivity decreases and dehydration, as well as over-hydrogenation becomes increasingly pronounced. In accordance with the present invention, therefore, when the hydrogenation temperature has reached about 525–550° F. and other indications are that the catalyst has become deactivated and spent, the aldehyde feed is cut out and a solvent, such as ethyl methyl ketone is passed into oven 2 through lines 4 and 6. In the preferred embodiment of the invention, a carbon monoxide-comprising gas is admitted into hydrogenation oven 2 through lines 8, 10, and 6. This gas may be synthesis gas of the same composition that is employed in the carbonylation stage, i. e. 1:1 $H_2/CO$, or it may be richer in CO. Relatively pure CO may also be used.

Within reactor 2 during the extraction cycle reaction conditions include pressures of 1500–4500 p. s. i. g., to ensure rapid conversion of deposited cobalt to carbonyl, and temperatures of about 150–300° F., and a liquid solvent rate of 0.25–2 v./v./hr. A gas rate of 100–15,000 cu. ft./barrel of solvent may be employed.

Solvent and reaction gases are withdrawn overhead through line 12, passed to liquid-gas separator 14, and gas is recycled to hydrogenator 2 via line 16. The solvent, containing in solution dissolved high boiling and semi-solid resinous products, is passed via lines 18 and 22 to fractionating tower 24; a portion of the solvent stream may be recycled to the extraction stage via lines 21 and 10. In the fractionation column 24, solvent is withdrawn overhead and, if needed, recycled to the extraction stage via line 32. The polymerized and resinous contaminants are withdrawn through line 34. It is usually desirable to maintain fractionation at atmospheric pressures, while the temperature depends upon the nature of the solvent.

After extraction with solvent and CO-containing gases is complete, aldehyde product and hydrogen may again be cut in and hydrogenation resumed as described. Frequently, however, it is desirable to resulfide the catalyst, which is carried out by passing a solvent containing $H_2S$ in solution through zone 2 via line 4. Such a solvent may be a naphtha, varsol, or other inert hydrocarbon fraction. The sulfiding operation follows essentially a pattern similar to the one heretofore described for the extraction operation. As shown by the data below, the extracted catalyst is considerably more amenable to sulfiding than the catalyst not so treated with extracting agents.

The process of the invention admits of numerous modifications apparent to those skilled in the art. It has already been pointed out that though the process of the invention finds its highest utility when a carbon-monoxide comprising gas is a part of the catalyst extracting system, nevertheless operation even without this adjuvant results in marked reactivation of catalyst. Also, other catalysts susceptible to contamination with polymeric materials and resins and deposited cobalt may be employed in the hydrogenation zone.

The invention and its advantages are further illustrated by the following specific examples.

Example I

A molybdenum sulfide catalyst supported on activated carbon which had become deactivated and spent in a commercial plant in the hydrogenation of isooctyl aldehydes was extracted in a vapor-jacket Soxhlet extractor operating at a temperature close to the boiling point of the solvent. The surface area measurements are given below, in comparison with similar data on spent catalyst and on an unused (i. e. fresh) catalyst.

| | Spent $MoS_2$ | Cat. extracted with $C_2H_5OH$ | Cat. extracted with $CH_3COC_2H_5$ | Fresh $MoS_2$ Cat. |
|---|---|---|---|---|
| Surface Area, M.²/g | 34 | 197 | 462 | 973 |
| Pore Volume | 0.03 | 0.13 | 0.24 | 0.49 |
| Pore Diameter | 35 | 26 | 21 | 20 |

These data clearly show the effect of solvent alone in increasing the surface area of the spent catalyst. This feature is particularly of importance in the case of catalysts having normally high surface areas, such as the activated carbon supported catalyst.

Example II

This example shows that extraction in accordance with the present invention not only improves the surface area properties but also restores the hydrogenating activity of the catalyst. In a series of tests in 3-liter shaker autoclaves, 500 grams of isooctyl aldehyde prepared by the oxonation of heptenes and thermally treated to remove cobalt, were hydrogenated for a four-hour period at 375° F. and 2800 p. s. i. g. The activity of the catalyst is evaluated in terms of the carbonyl number of the product. Data showing the performance of ethanol extraction at atmospheric pressure are as follows:

| Catalyst | Spent $MoS_2$ on Charcoal | $C_2H_5OH$-Extracted $MoS_2$ | Fresh Cat. |
|---|---|---|---|
| Surface Area | 34 M.²/g | 197 M.²/g | 973 M.²/g. |
| Carbonyl No. of product | 85 | 3 | 1. |

These data show that ethanol extraction virtually restores catalyst activity.

Example III

To demonstrate the increased susceptibility of the extracted catalyst to sulfiding over the unextracted catalyst, the following data are presented. Reaction conditions were chosen such that less than complete hydrogenation would result, in order to point up differences in the spent catalyst pretreatment. In run B below, a "spent" catalyst was resulfided while in run E, the same spent catalyst was extracted with methyl ethyl ketone and synthesis gas and thereafter resulfided. The extraction was carried out for two hours with solvent/catalyst weight ratio of about 2/1. The performance of each treat was thereafter evaluated by the product carbonyl number and the isooctyl alcohol yield, isooctyl aldehyde being the feed, and molybdenum sulfide on charcoal being the hydrogenation catalyst. The conditions for hydrogenation included pressures of 2700–2900 p. s. i. g., temperatures of 375° F., 4 hour autoclave reaction time, and 10% water added to the aldehyde feed.

In run C, the spent catalyst was treated with CO-containing gas prior to hydrogenation, while in run D, the catalyst thus pretreated was also resulfided.

| Catalyst Treatment | None | $H_2S$ Sulf. 8 Hrs. 850° F. | CO (Syn. Gas) Treated 6 Hrs. 200° F. | CO Treated Sample $H_2S$ Sulf. 8 Hrs. @ 850° F. | MEK Extracted Sample $H_2S$ Sulf. 8 Hrs. @ 850° F. |
|---|---|---|---|---|---|
| Run No., IH | A | B | C | D | E |
| Product Carbonyl No | 57 | 28.4 | 67.3 | 45.6 | 24.4 |
| Product Distribution: | | | | | |
| Wt. Percent Hydrocarbon | 11.6 | 13.0 | 13.3 | 11.7 | 11.8 |
| Wt. Percent Intermediate | 0.3 | 1.9 | 3.7 | 2.9 | 0.3 |
| Wt. Percent $C_8$ Alcohol— | | | | | |
| 340–390° F | 50.1 | 56.2 | 51.7 | 59.8 | 61.4 |
| (380–390° F. Fraction) | (5.4) | (19.1) | (0.5) | (1.7) | (4.4) |
| Wt. Percent Bottoms | 38.0 | 28.9 | 31.3 | 26.2 | 26.5 |

These results clearly show that, both from the standpoint of activity (carbonyl number) and selectivity (alcohol yield), substantially improved results were obtained by first extracting the catalyst with solvent, preferably in the presence of a CO-containing gas, prior to resulfiding. Also, treatment of the spent catalyst with carbon monoxide alone, with or without subsequent sulfiding, is shown not to be a completely satisfactory method for reactivating spent hydrogenation catalysts of the sulfactive type.

What is claimed is:

1. The process of regenerating a spent sulfactive Oxo aldehyde hydrogenation catalyst which is molybdenum sulfide supported on activated carbon, said spent catalyst being deactivated by deposits of high boiling organic materials including polymers and cobalt deposits, which comprises contacting said deactivated catalyst with a liquid polar organic solvent which dissolves the organic materials and with carbon monoxide-comprising gas at a pressure of about 1500 to 4500 p. s. i. g. and temperature of about 100° to 450° F. to remove said deposits from said catalyst prior to resulfiding said catalyst.

2. The process of regenerating a spent sulfactive Oxo aldehyde hydrogenation catalyst which is molybdenum sulfide supported on activated carbon, said catalyst being deactivated by deposits of high boiling organic materials when used for hydrogenating Oxo aldehyde to an alcohol and is resulfided for further use, which comprises contacting the spent catalyst with a liquid polar organic solvent selected from the class consisting of an alcohol and a ketone, and a carbon monoxide-comprising gas at a pressure of about 1500–4500 p. s. i. g. and a temperature of about 100° to 450° F. to remove deposited solids from said catalyst prior to resulfiding said catalyst.

3. The process of claim 2 wherein the solvent is methyl ethyl ketone.

4. The process of claim 2 wherein said solvent is ethanol.

References Cited in the file of this patent

UNITED STATES PATENTS

| 2,604,491 | Hale | July 22, 1952 |
| 2,621,203 | Cope | Dec. 9, 1952 |
| 2,632,015 | Kratzer | Mar. 17, 1953 |